(12) United States Patent
Ito et al.

(10) Patent No.: US 11,549,430 B1
(45) Date of Patent: Jan. 10, 2023

(54) TWO-STROKE ENGINE

(71) Applicant: YAMABIKO CORPORATION, Tokyo (JP)

(72) Inventors: Kenta Ito, Tokyo (JP); Takahiro Yamazaki, Tokyo (JP); Shouta Genba, Tokyo (JP); Takahiro Kinoshita, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/842,823

(22) Filed: Jun. 17, 2022

(30) Foreign Application Priority Data

Jul. 15, 2021 (JP) .............................. JP2021-117235

(51) Int. Cl.
| | |
|---|---|
| *F02B 25/14* | (2006.01) |
| *F02B 33/04* | (2006.01) |
| *F02F 1/22* | (2006.01) |
| *F02B 75/02* | (2006.01) |

(52) U.S. Cl.
CPC .............. *F02B 25/14* (2013.01); *F02B 33/04* (2013.01); *F02F 1/22* (2013.01); *F02B 2075/025* (2013.01)

(58) Field of Classification Search
CPC .... F02B 25/14; F02B 33/04; F02B 2075/025; F02F 1/22
See application file for complete search history.

(56) References Cited

U.S. PATENT DOCUMENTS

| | | | | |
|---|---|---|---|---|
| 1,671,271 | A | * | 5/1928 | Blumenthal .............. F01L 5/06 123/67 |
| 3,797,467 | A | * | 3/1974 | Tenney ................... F02B 25/00 123/73 AA |
| 6,718,917 | B2 | | 4/2004 | Andersson et al. |
| 2019/0234262 | A1 | * | 8/2019 | Ishikawa ................ F02B 75/22 |

FOREIGN PATENT DOCUMENTS

| | | |
|---|---|---|
| JP | S60-222521 A | 11/1985 |
| JP | 5060459 B2 | 10/2012 |

* cited by examiner

*Primary Examiner* — Syed O Hasan
(74) *Attorney, Agent, or Firm* — Kilyk & Bowersox, P.L.L.C.

(57) ABSTRACT

An engine (2) is a four-flow scavenging type engine. Four scavenging ports (34) include: first right and left scavenging ports (34(lef-1) and 34(ref-1)) that lie on a side relatively away from an exhaust port (22) and that lie facing each other with a cylinder (4) in between; and second right and left scavenging ports (34(lef-2) and 34(ref-2)) that lie closer to the exhaust port (22) than first right and left scavenging ports do and that lie facing each other with the cylinder (4) in between. The second left scavenging port and the first right scavenging port that make up a first mutually diagonal set (Diag-No. 1) have different opening timings from those of the first left scavenging port and the second right scavenging port that make up a second mutually diagonal set (Diag-No. 2).

12 Claims, 16 Drawing Sheets

TWO-STROKE ENGINE

BACKGROUND OF THE INVENTION

The present invention relates to a two-stroke engine for work machines, and more particularly, to emission gas countermeasure technology.

In a scavenging process, a traditional two-stroke engine performs scavenging by supplying air-fuel mixture pre-compressed in a crank chamber to a combustion chamber through scavenging ports opening on a cylinder. The two-stroke engine includes at least one pair of scavenging ports. The paired scavenging ports are arranged facing each other and are opened/closed by a piston.

The two-stroke engine involves a problem of "blow-by". The "blow-by" is a phenomenon where part of air-fuel mixture supplied to the combustion chamber blows off together with exhaust gas through an exhaust port. This "blow-by" is a well-known and important issue of the two-stroke engine.

In order to overcome emission regulations tightened year by year, there are proposed: a four-flow scavenging type engine in which the number of the scavenging ports is increased to four (two pairs of scavenging ports); a six-flow scavenging type engine (JP60-222521A) in which the number of the scavenging ports is increased to six (three pairs of scavenging ports); and a stratified scavenging type engine (U.S. Pat. No. 6,718,917 B2) in which leading air is supplied to the combustion chamber before air-fuel mixture is supplied to the combustion chamber in the scavenging process.

JP5060459 points out the following problem regarding the two-stroke engine. In the two-stroke engine, air-fuel mixtures fed into the combustion chamber from the paired scavenging ports confronting each other strongly collide at the center of the cylinder. This collision brings about a shortcut phenomenon where part of air-fuel mixture flows in the exhaust port. JP5060459 points out that this shortcut phenomenon is the cause of the "blow-by" problem. JP5060459 proposes to, in the four-flow scavenging type engine, dispose a shield member on each of first and second scavenging passages diagonally positioned with the cylinder in between constituting one set of scavenging passage of two sets of scavenging passages. The shield member has a plurality of holes formed thereon. In the scavenging process, the flow velocities of air-fuel mixtures discharged from the scavenging passages each having the porous shield into the combustion chamber are lower than the flow velocities of air-fuel mixtures discharged from the scavenging passages without the shield member into the combustion chamber.

In a common four-flow scavenging type engine, air-fuel mixtures fed from the two pairs of confronting scavenging ports into the combustion chamber collide at the center of the cylinder. Unlike this common four-flow scavenging type engine, in the four-flow scavenging type engine of JP-5060459, the porous shield member is disposed on one diagonally paired scavenging ports of the four scavenging ports, thereby attenuating the flow velocities of the air-fuel mixtures discharged from the scavenging ports. As a result, collision between air-fuel mixtures discharged from the two mutually facing scavenging ports weakens and the location of collision is offset from the center of the cylinder. This can suppress the "blow-by" problem. Even with such a configuration, however, the cause of the unburned gas emission still remains unsolved since air-fuel mixtures discharged from the two confronting scavenging ports collide and reverse at a relatively early stage of the scavenging process.

SUMMARY OF THE INVENTION

An object of the present invention is to provide a two-stroke engine capable of suppressing "blow-by" that is an issue of the two-stroke engine and overcoming further emission regulations.

The above object can be accomplished by providing a two-stroke engine that executes scavenging by supplying fresh gas pre-compressed in a crank chamber through scavenging ports to a combustion chamber in a scavenging process, comprising:

at least four scavenging ports,
the four scavenging ports including:
first right and left scavenging ports that lie on a side relatively away from an exhaust port and that lie facing each other with a cylinder in between; and
second right and left scavenging ports that lie closer to the exhaust port than the first right and left scavenging ports do and that lie facing each other with the cylinder in between, wherein
the second left scavenging port and the first right scavenging port that make up a first mutually diagonal set have different opening timings from those of the first left scavenging port and the second right scavenging port that make up a second mutually diagonal set.

Effects and other objects of the present invention will become apparent from the following detailed description of preferred embodiments and their variants of the present invention.

DETAILED DESCRIPTION OF THE PRESENT INVENTION

Preferred embodiments of the present invention will now be described with reference to the accompanying drawings. FIGS. 1 to 11 are diagrams for explaining a two-stroke engine 2 of a first embodiment, and a variant related thereto.

Figure 1:
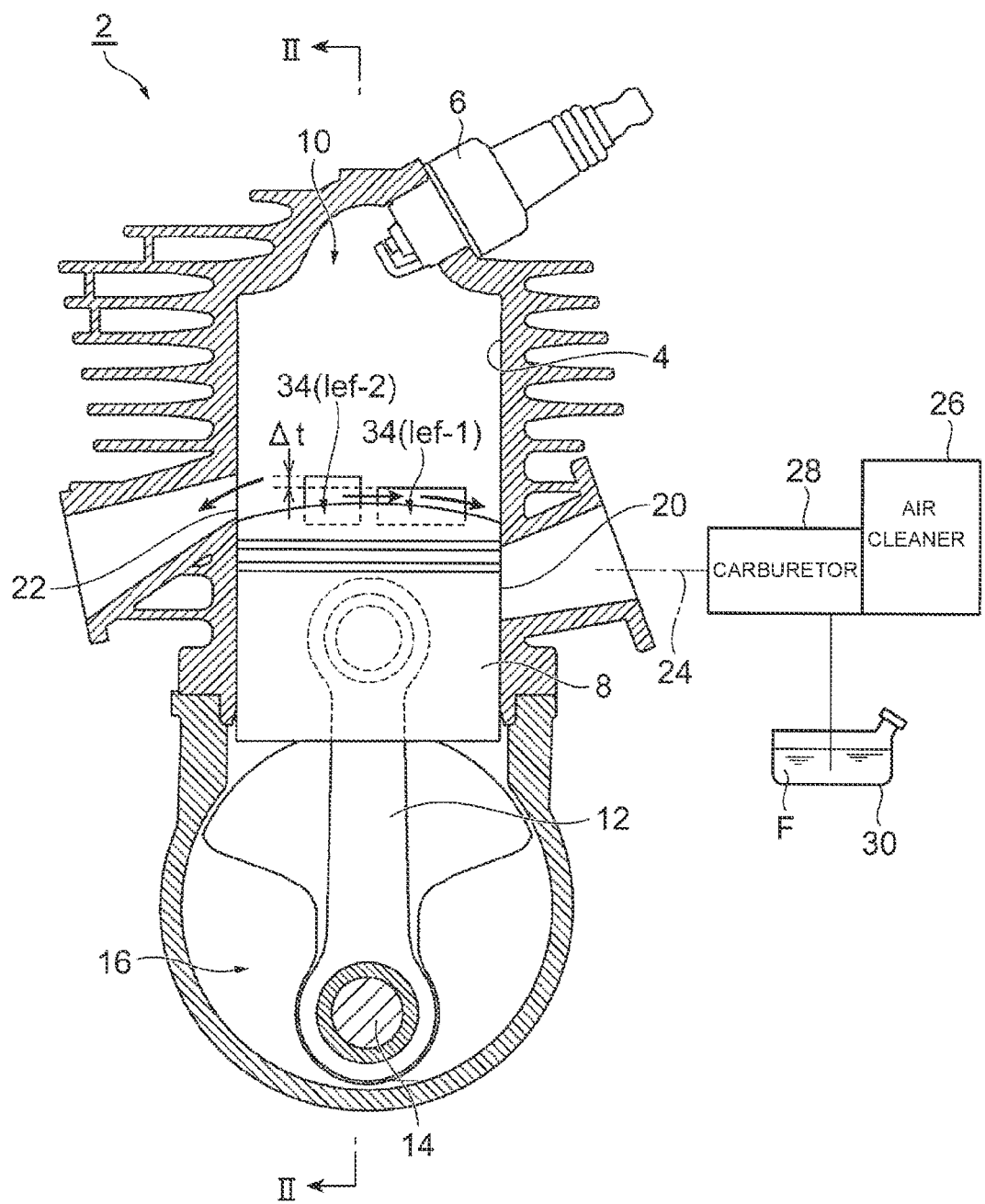
FIG. 1 is a longitudinal section view of a two-stroke engine of a first embodiment.
Figure 2:
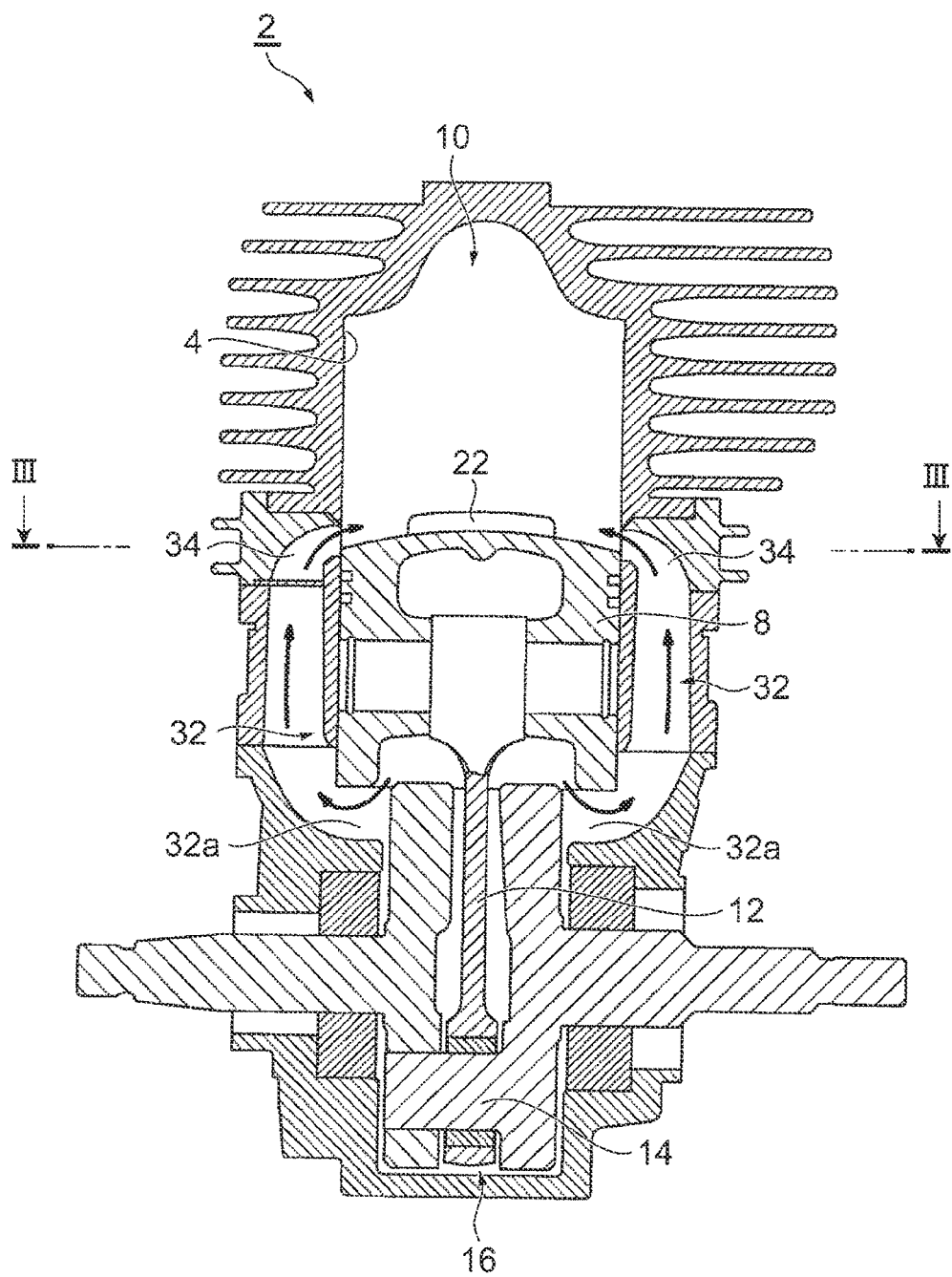
FIG. 2 is a section view of the four-flow scavenging type two-stroke engine of the first embodiment, taken along a line II-II of FIG. 1.

FIG. 1 is a longitudinal section view of the two-stroke engine 2 and FIG. 2 is a section view taken along a line II-II of FIG. 1. The two-stroke engine 2 shown is a small-sized engine mounted on portable work machines such as brush cutters, chainsaws, and blowers, and is an air-cooled single-cylinder engine.

Reference numeral 4 denotes a cylinder and 6 denotes a spark plug (FIG. 1). A piston 8 is reciprocatingly fitted into the cylinder 4 to define a combustion chamber 10. A reciprocating motion of the piston 8 is transmitted via a connecting rod 12 to a crankshaft 14. The crankshaft 14 converts the reciprocating motion of the piston 8 into a rotary motion and outputs it. As is well known, the crankshaft 14 is housed in a crank chamber 16.

Referring to FIG. 1, reference numeral 20 denotes an intake port and reference numeral 22 denotes an exhaust port. The intake port 20 and the exhaust port 22 are opened and closed by the piston 8. An intake passage 24 is connected to the intake port 20. The intake passage 24 includes an air cleaner 26 at its upstream end, and a carburetor 28 thereto. The carburetor 28 sucks up fuel F from a fuel tank 30 to produce an air-fuel mixture and supplies the air-fuel mixture to the intake port 20.

The air-fuel mixture is supplied through the intake port 20 to the crank chamber 16. The air-fuel mixture (fresh gas) in the crank chamber 16 is pre-compressed by a descending motion of the piston 8. The air-fuel mixture (fresh gas) pre-compressed in the crank chamber 16 is supplied through a scavenging passage 32 (FIG. 2) to the combustion chamber 10 in a scavenging process.

Referring to FIG. 2, the scavenging passage 32 is in the form of a vertically extending passage. A lower end 32a of the scavenging passage 32 opens to the crank chamber 16. An upper end of the scavenging passage 32 constitutes a scavenging port 34, which communicates with the combustion chamber 10. The scavenging port 34 is opened and closed by the piston 8. Since the structures of the scavenging passage 32 and the piston open/close scavenging port 34 are well known, detailed explanations thereof will be omitted.

Figure 3:
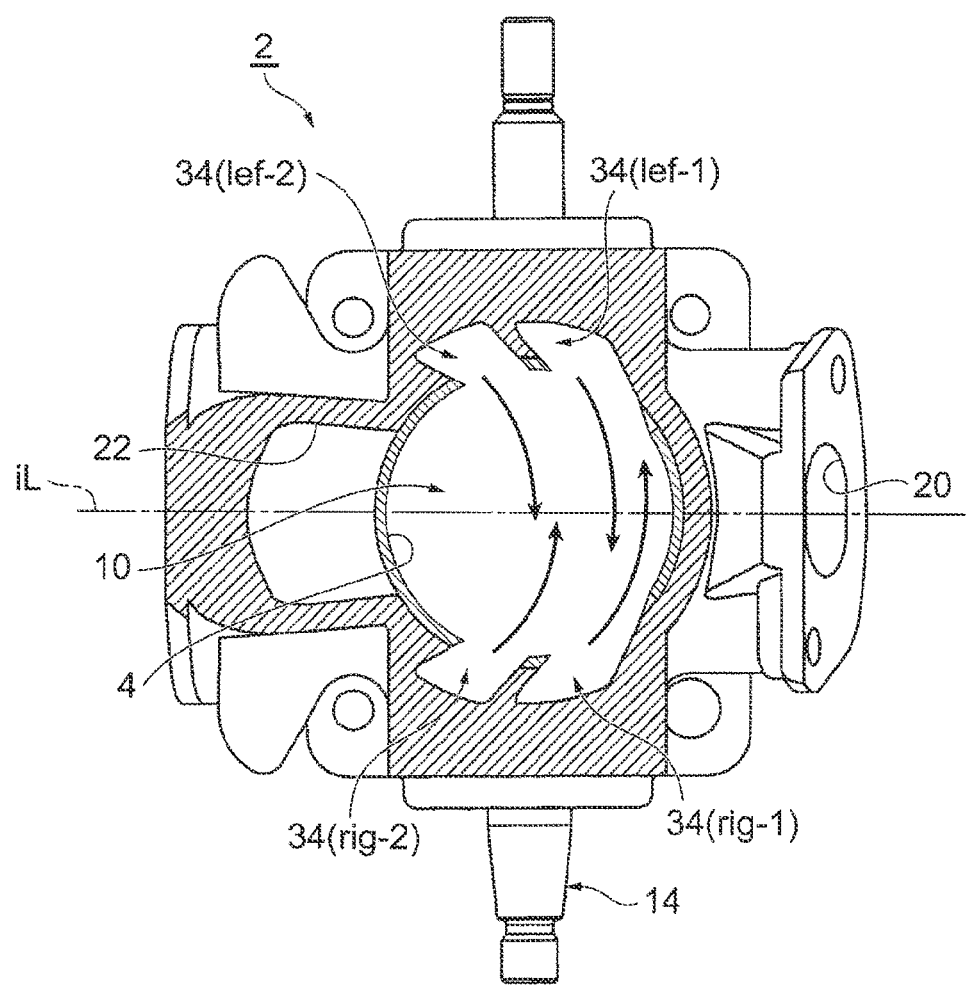
FIG. 3 is a transverse section view of the two-stroke engine of the first embodiment, taken along a line of FIG. 2.

FIG. 3 is a section view taken along a line of FIG. 2. The two-stroke engine 2 of the first embodiment is a four-flow scavenging type engine having four scavenging ports 34 and is a well-known Schnuerle scavenging type engine. When the cylinder 4 is viewed in plan, two scavenging ports 34 lie on one side and the other two scavenging ports 34 lie on the other side, with a center line IL in between that joins the intake port 20 and the exhaust port 22.

In describing the present invention, each of the four scavenging ports 34 needs to be identified. Each scavenging port 34 is identified as follows. The two scavenging ports 34 lying on one side with respect to the center line iL are referred to as "right scavenging ports", for which (rig) is added to reference numeral 34. The scavenging port lying away from the exhaust port 22 side, i.e. toward the intake port 20 side, of the two right scavenging ports 34(rig), is referred to as "first right scavenging port", for which (rig-1) is added to reference numeral 34. The scavenging port lying toward the exhaust port 22 side, of the two right scavenging ports 34(rig), is referred to as "second right scavenging port", for which (rig-2) is added to reference numeral 34.

Similarly, the two scavenging ports 34 lying on the other side with respect to the center line iL are referred to as "left scavenging ports", for which (lef) is added to reference numeral 34. The scavenging port lying away from the exhaust port 22 side, i.e. toward the intake port 20 side, of the two left scavenging ports 34(lef), is referred to as "first left scavenging port", for which (lef-1) is added to reference numeral 34. The scavenging port lying toward the exhaust port 22 side, of the two left scavenging ports 34(lef), is referred to as "second left scavenging port", for which (lef-2) is added to reference numeral 34.

The first right scavenging port 34(rig-1) and the first left scavenging port 34(lef-1) lie facing each other with the cylinder 4 in between. The second right scavenging port 34(rig-2) and the second left scavenging port 34(lef-2) lie facing each other with the cylinder 4 in between.

Figure 4:
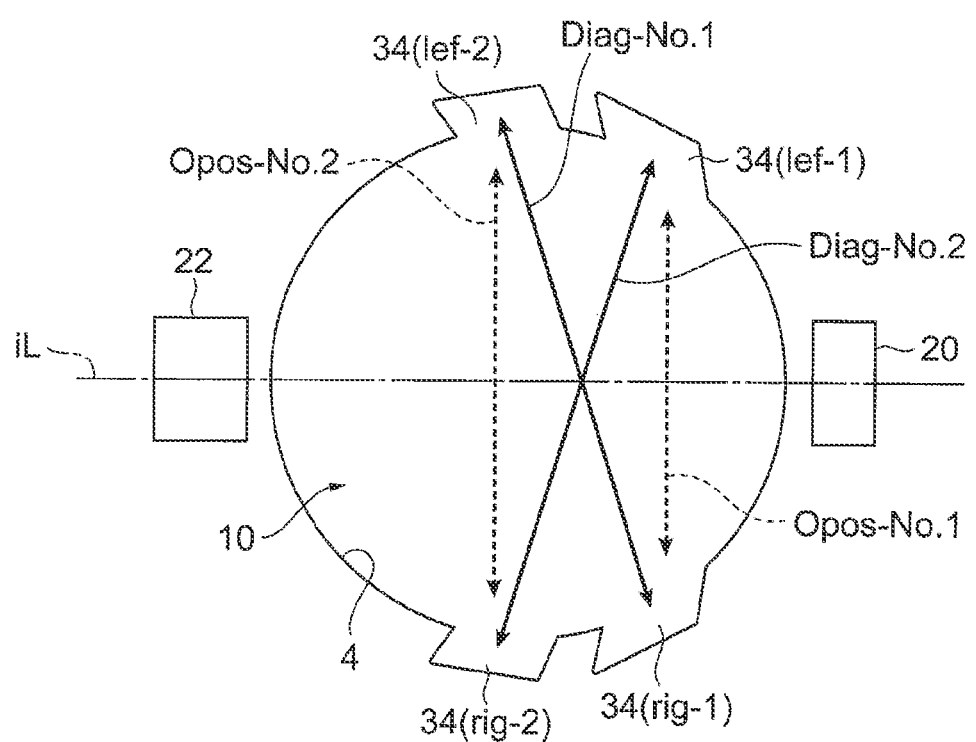
FIG. 4 is a diagram for explaining the terms of "opposed" and "diagonal" used in the description of the present application.

Referring to FIG. 4, the two-stroke engine 2 of the first embodiment is the four-flow scavenging type engine, as described above. The first right scavenging port 34(rig-1) and the first left scavenging port 34(lef-1) lie away from the exhaust port 22 side, e.g. toward the intake port 20 side, whereas the second right scavenging port 34(rig-2) and the second left scavenging port 34(lef-2) lie toward the exhaust port 22 side.

Referring to FIGS. 1 and 3, the first right scavenging port 34(rig-1) and the first left scavenging port 34(lef-1) facing each other have a rectangular shape of the same size when viewed from the front. The second right scavenging port 34(rig-2) and the second left scavenging port 34(lef-2) have also a rectangular shape of the same size when viewed from the front.

The front-view shape of the first right scavenging port 34(rig-1) and the first left scavenging port 34(lef-1) and the front-view shape of the second right scavenging port 34(rig-2) and the second left scavenging port 34(lef-2) are not limited to the rectangle and may have any shape. The transversely sectioned shape of the first right scavenging port 34(rig-1) and the first left scavenging port 34(lef-1) may be a substantially rectangular shape or a substantially triangular shape. Similarly, the transversely sectioned shape of the second right scavenging port 34(rig-2) and the second left scavenging port 34(lef-2) may be a substantially rectangular shape or a substantially triangular shape.

It has two meanings that the transversely sectioned shape of the first right scavenging port 34(rig-1) and the first left scavenging port 34(lef-1) and/or of the second right scavenging port 34(rig-2) and the second left scavenging port 34(lef-2) may be the substantially triangular shape. One is a triangle having a vertex facing the cylinder 4, and the other is a triangle having a bottom line facing the cylinder 4.

In the four-flow scavenging type engine 2 of this embodiment, the first right scavenging port 34(rig-1) and the first left scavenging port 34(lef-1) facing each other are basically of the same shape, with air-fuel mixture discharged from the first right scavenging port 34(rig-1) and the first left scavenging port 34(lef-1) being directed away from the exhaust port 22.

Although, in the four-flow scavenging type engine 2 of this embodiment, the first right scavenging port 34(rig-1) and the first left scavenging port 34(lef-1) facing each other have different opening timings, in the prior art the opening timings of the first right and left scavenging ports 34(rig-1) and 34 (lef-1) are synchronized with each other. In this prior art example, the first right scavenging port 34(rig-1) and the first left scavenging port 34(lef-1) gradually open according as the piston 8 descends, and air-fuel mixtures begin to be discharged simultaneously from both the scavenging ports 34(rig-1) and 34 (lef-1) as the openings thereof increase. In this prior art example, in the case where the right scavenging port 34(rig-1) and the first left scavenging port 34(lef-1) facing each other are disposed substantially symmetrically with respect to the center line iL, similar to the four-flow scavenging type engine 2 of this embodiment, the orientation of a first air-fuel mixture discharged from the first right scavenging port 34(rig-1) that varies in accordance with the descent of the piston 8 is axisymmetric with the orientation of a second air-fuel mixture discharged from the first left scavenging port 34(lef-1), so that the first air-fuel mixture and the second air-fuel mixture collide in a first area on the center line iL. Even in the case where the first right scavenging port 34(rig-1) and the first left scavenging port 34(lef-1) facing each other are not precisely axisymmetric with the center line iL, if the opening timings of the first scavenging ports 34(rig-1) and 34(lef-1) are in synchronism with each other, the air-fuel mixtures discharged from both the scavenging ports collide at a position slightly offset from the center line iL. Since the air mixtures that have collided at either position reverse their respective orientations at the collision position to make a shortcut to the exhaust port 22, this is a cause of conventional unburned gas emissions.

The same applies to the second right scavenging port 34(rig-2) and the second left scavenging port 34(lef-2) facing each other. The orientation of a third air-fuel mixture discharged from the second right scavenging port 34(rig-2) that varies in accordance with the descent of the piston 8 and the orientation of a fourth air-fuel mixture discharged from the second left scavenging port 34(lef-2) are axisymmetric with respect to the center line iL. For this reason, the third air-fuel mixture and the fourth air-fuel mixture are basically set to collide in a second area different from the first area.

Referring to FIG. 3, though the orientations of the first right scavenging port 34(rig-1) and the first left scavenging port 34(lef-1) may be set to collide at a central portion of the cylinder 4, the orientation of the first right scavenging port 34(rig-1) may slightly differ from the orientation of the first left scavenging port 34(lef-1) so as not to collide at the central portion of the cylinder 4 as shown in FIG. 3. Similarly, as regards the orientations of the second right scavenging port 34(rig-2) and the second left scavenging port 34(lef-2), as shown in FIG. 3, the orientation of the second right scavenging port 34(rig-2) may slightly differ from the orientation of the second left scavenging port 34(lef-2) so as to prevent collision at the central portion of the cylinder 4.

The above is a basic design policy of the four scavenging ports 34 of the general and traditional four-flow scavenging type engine. It is the basic design policy that the two scavenging ports 34 facing each other open at the same timing.

The two-stroke engine 2 of the first embodiment respects the basic design policy of the above traditional four-flow scavenging type engine and changes the setting of opening timings of the scavenging ports 34 especially under the division into a first set of and a second set of opposed scavenging ports 34 (Opos-No. 1) and (Opos-No. 2).

As described above, the two-stroke engine 2 of the first embodiment is the four-flow scavenging type engine and, referring to FIG. 4, following two sets of scavenging ports 34 each have a mutually opposed relationship.

(1) First Pair of Opposed Scavenging Ports (Opos-No. 1):
The first right scavenging port 34(rig-1) and the first left scavenging port 34(lef-1) are first set of opposed scavenging ports Opos-No. 1.

(2) Second Pair of Opposed Scavenging Ports (Opos-No. 2):
The second right scavenging port 34(rig-2) and the second left scavenging port 34(lef-2) are the second set of opposed scavenging ports Opos-No. 2.

The concept of "diagonal" necessary for describing the present invention will specifically be described. Following two sets of scavenging ports 34 each have a mutually diagonal relationship.

(1) First Pair of Diagonal Scavenging Ports (Diag-No. 1):
The second left scavenging port 34(lef-2) and the first right scavenging port 34(rig-1) are first set of diagonal scavenging ports Diag-No. 1.

(2) Second Pair of Diagonal Scavenging Ports (Diag-No. 2):
The first left scavenging port 34(lef-1) and the second right scavenging port 34(rig-2) are second set of diagonal scavenging ports Diag-No. 2.

Figure 5:
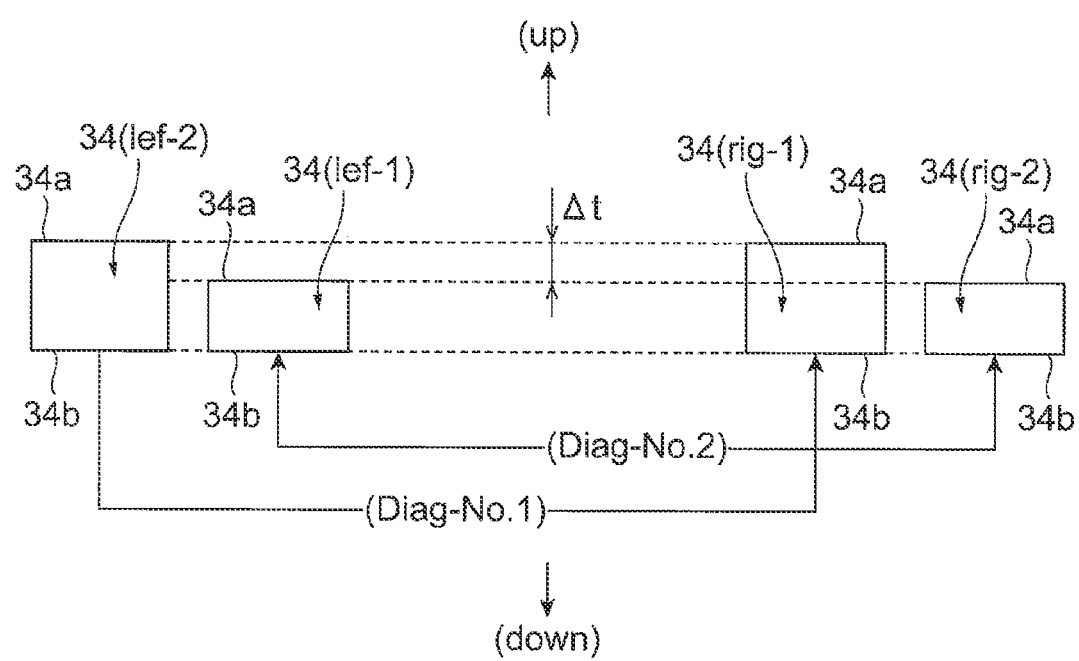
FIG. 5 is a diagram of four scavenging ports, laid out flat in plan, included in the four-flow scavenging type engine of the first embodiment.

FIG. 5 is a diagram showing the four scavenging ports 34 with the cylinder 4 being laid out flat, and is a view for explaining the opening and closing timings of the first set of diagonal scavenging ports Diag-No. 1 and the second set of diagonal scavenging ports Diag-No. 2. "Up" shown in FIG. 5 indicates a direction toward a piston top dead center, while "Down" indicates a direction toward a piston bottom dead center. As can be seen from FIG. 5, the first set of diagonal scavenging ports Diag-No. 1 open at an earlier timing than the second set of diagonal scavenging ports Diag-No. 2.

As described above, the 2-cycle engine 2 of the first embodiment has the four scavenging ports 34 each having a substantially rectangular shape when viewed from the front. In FIG. 5, exemplary reference is made to the second left scavenging port 34(lef-2), which has an upper edge 34a and a lower edge 34b that extend substantially horizontally, with the piston 8 passing through the upper edge 34a and the lower edge 34b to open/close the second left scavenging port 34(lef-2).

The upper edge 34a of the first set of scavenging ports Diag-No. 1 lies at a height level higher by $\Delta t$ than the upper edge 34a of the second set of scavenging ports Diag-No. 2. Accordingly, as described above, the first set of scavenging ports Diag-No. 1 open earlier than the second set of scavenging ports Diag-No. 2. In this manner, by allowing the first set Diag-No. 1 and the second set Diag-No. 2 to have different opening timings, a first pressure of the air-fuel mixture (fresh gas) entering the combustion chamber 10 through the opened first set Diag-No. 1 can differ from a second pressure of the air-fuel mixture (fresh gas) entering the combustion chamber 10 through the opened second set Diag-No. 2.

As regards the horizontally extending upper edges 34a of the four rectangular scavenging ports 34, the upper edges 34a of the second left scavenging port 34(lef-2) and the first right scavenging port 34(rig-1) making up the first set of scavenging ports Diag-No. 1 lie at the same height level. As a result, the scavenging ports 34(lef-2) and 34(rig-1) of the first set Diag-No. 1 have the same opening timings so that the first set of diagonal scavenging ports Diag-No. 1 open in synchronism.

Similarly, the upper edges 34a of the first left scavenging port 34(lef-1) and the second right scavenging port 34(rig-2) making up the second set of scavenging ports Diag-No. 2 lie at the same height level, and hence the scavenging ports 34(lef-1) and 34(rig-2) of the second set Diag-No. 2 have the same opening timing so that the second set of diagonal scavenging ports Diag-No. 2 open in synchronism.

As a variant, in the case where the first set of scavenging ports Diag-No. 1 open in synchronism, the opening timings of the scavenging ports 34(lef-1) and 34(rig-2) of the second set Diag-No. 2 need not completely coincide. Similarly, in the case where the second set of scavenging ports Diag-No. 2 open in synchronism, the opening timings of the scavenging ports 34(lef-2) and 34(rig-1) of the first set Diag-No. 1 need not completely coincide.

The closing timings of the four scavenging ports 34 will be described. Referring to FIG. 5, the first and second sets of scavenging ports Diag-No. 1 and Diag-No. 2, i.e. the four scavenging ports 34 have their respective lower edges 34b set at the same height level. Accordingly, the four scavenging ports 34 included in the two-stroke engine 2 of the first embodiment are set so as to close in synchronism. As a result, the opening height of the two scavenging ports of the first set of scavenging ports Diag-No. 1 is greater than the opening height of the two scavenging ports of the second set of scavenging ports Diag-No. 2.

Although in the example shown in FIG. 5 the second left scavenging port 34(lef-2) and the first right scavenging port 34(rig-1) are defined as the first set of scavenging ports Diag-No. 1, they may be defined as the second set of scavenging ports Diag-No. 2, and the second right scavenging port 34(rig-2) and the first left scavenging port 34(lef-1) may be defined as the first set of scavenging ports Diag-No. 1.

As used herein, the term "synchronism" is not limited to full synchronism. In the case of full synchronism, the term "full synchronism" is used. The meaning of the phrase "the first set of scavenging ports Diag-No. 1 open in synchronism" includes the meaning that the first set of scavenging ports Diag-No. 1 open in full synchronism and the meaning that they open at approximately the same timing. The meaning of the phrase "the second set of scavenging ports Diag-No. 2 open in synchronism" includes the meaning that the second set of scavenging ports Diag-No. 2 open in full synchronism and the meaning that they open at approximately the same timing. The phase "approximately the same timing" includes the meaning that the opening timings of the first set Diag-No. 1 and the opening timings of the second set Diag-No. 2 are distinguishable and that different timings are included in a range that does not confuse this distinction. It should be understood that the above description applies also to "synchronism" used in the closing timings of the first set of scavenging ports Diag-No. 1 and the closing timings of the second set of scavenging ports Diag-No. 2.

Figure 6:
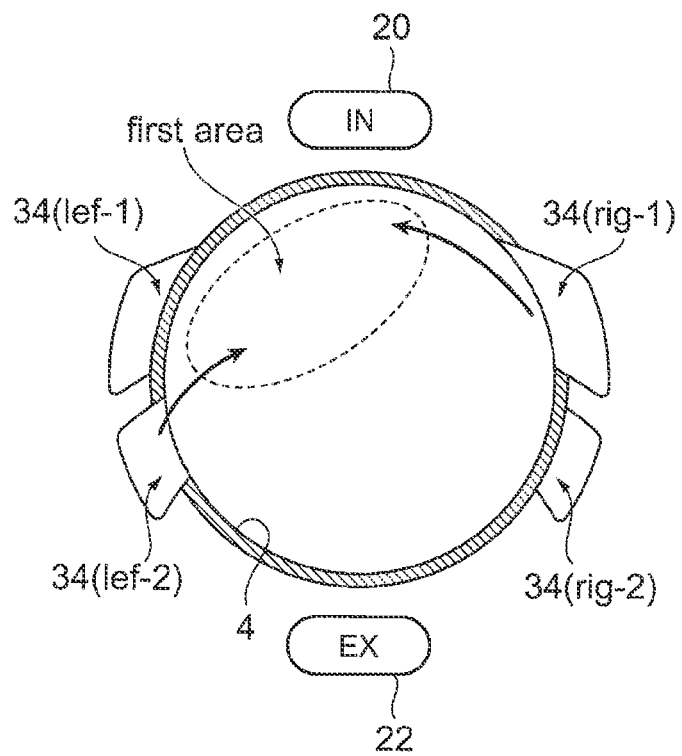
FIG. 6 is a function explanatory view of the two-stroke engine of the first embodiment and is a diagram for explaining the state of air-fuel mixtures (fresh gas) entering a combustion chamber immediately after ((II) of FIG. 6) a first set of diagonal scavenging ports begin to open.
Figure 6:
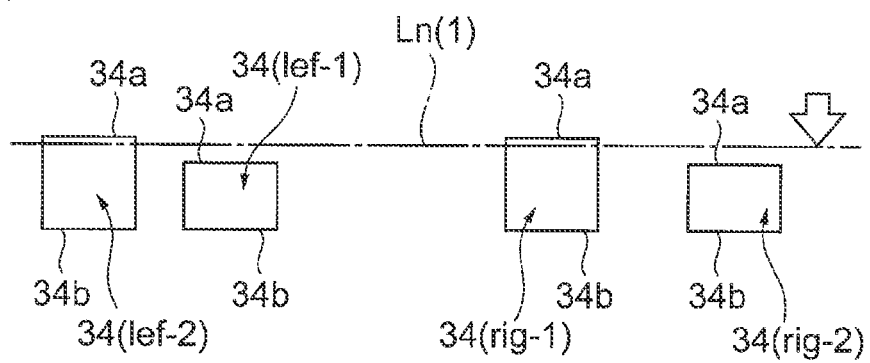
Figure 7:
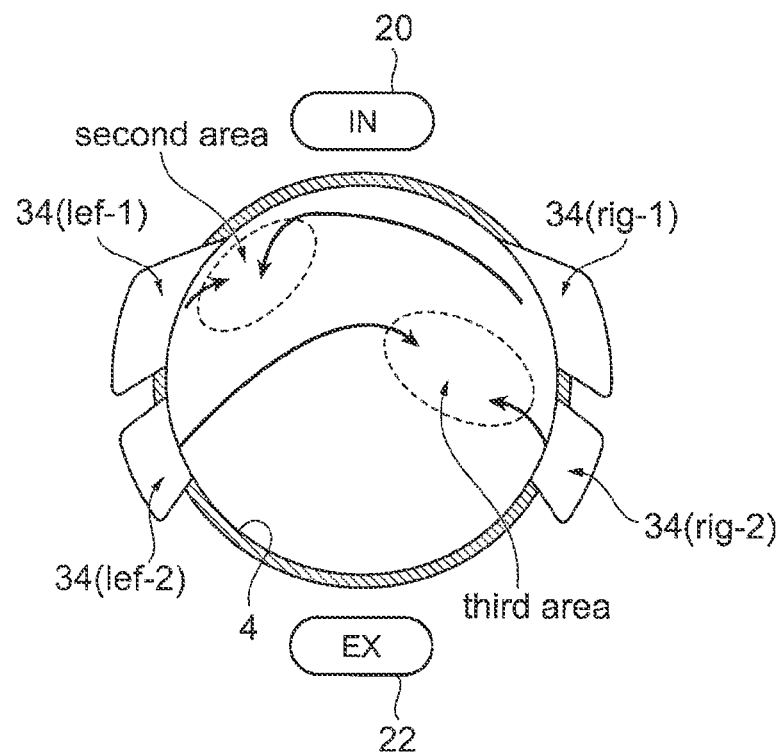
FIG. 7 is a function explanatory view of the two-stroke engine of the first embodiment and is a diagram for explaining the state of air-fuel mixtures (fresh gas) in the combustion chamber immediately after ((II) of FIG. 7) a second set of diagonal scavenging ports begin to open after the first set of diagonal scavenging ports begin to open.
Figure 7:
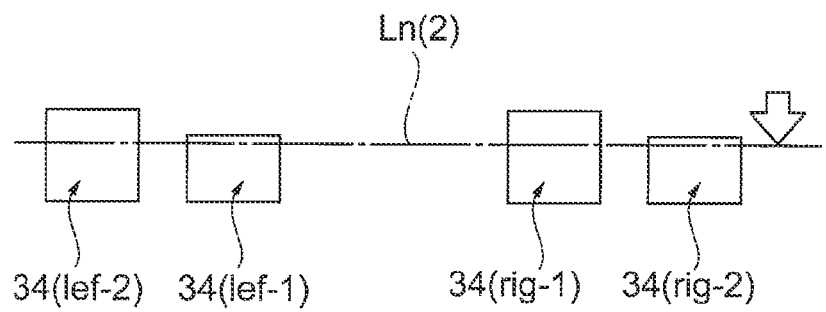
Figure 8:
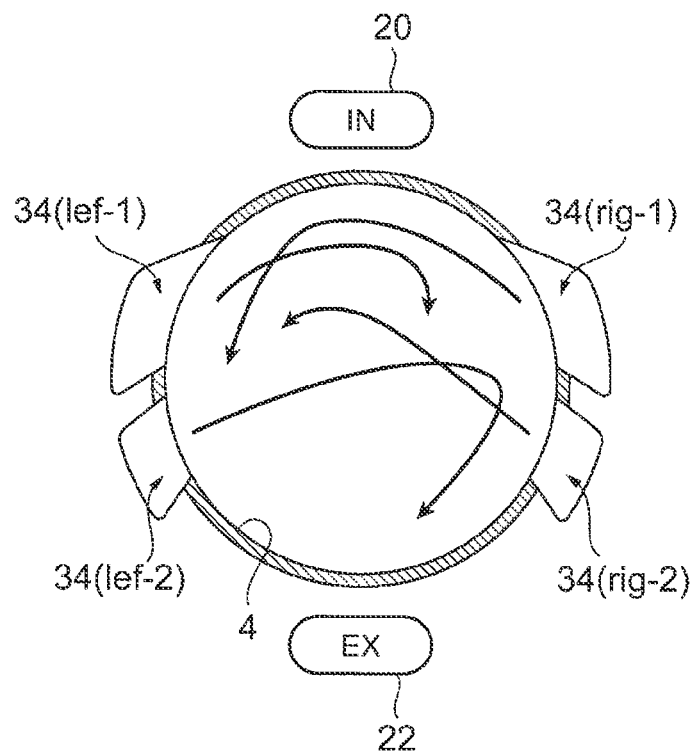
FIG. 8 is a function explanatory view of the two-stroke engine of the first embodiment and is a diagram for explaining the state of air-fuel mixtures (fresh gas) in the combustion chamber immediately before ((II) of FIG. 8) the opened first and second sets of diagonal scavenging ports close.
Figure 8:
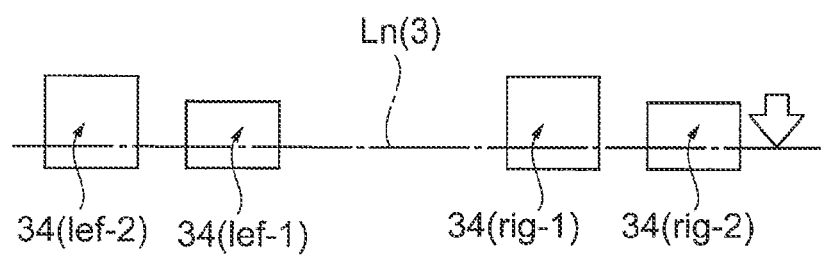

Referring to FIGS. 6 to 8, effects of the two-stroke engine 2 of the embodiment will be described. FIG. 6 shows in (II) a timing when the scavenging ports 34 begin to open in a descending stroke of the piston 8, and shows in (I) an action at that time. In (II) of FIG. 6, a line Ln(1) indicates an upper edge position of the piston 8. In a scavenging process, first, the diagonally positioned first right scavenging port 34(rig-1) and second left scavenging port 34(lef-2) begin to open. In other words, the scavenging port 34(rig-1) and the scavenging port 34(lef-2) located at a first diagonal position begin to open. The second right scavenging port 34(rig-2) and the first left scavenging port 34(lef-1) located at a second diagonal position remain closed.

As shown in (I) of FIG. 6, a first air-fuel mixture discharged from the first right scavenging port 34(rig-1) and a second air-fuel mixture discharged from the second left scavenging port 34(lef-2) flow into a first area offset from the central portion of the cylinder 4. The first right scavenging port 34(rig-1) and the second left scavenging port 34(lef-2) do not face each other with the cylinder 4 in between. Since these are located at a diagonal position, the distance for each of the both to reach the first area can be elongated. The first area offset from the center line iL appears as an initial inflow area. Since the first air-fuel mixture and second air-fuel mixture respectively from the first right scavenging port 34(rig-1) and second left scavenging port 34(lef-2) diagonally positioned flow into the first area, the first and second air-fuel mixtures do not collide and the first area appears at a position offset from the central portion of the cylinder 4 as described above. In the first area, the first air-fuel mixture discharged from first right scavenging port 34(rig-1) and the second air-fuel mixture discharged from the second left scavenging port 34(lef-2) do not collide at the time of initial scavenging, due to elongated distance for each of the both to reach. When the first air-fuel mixture and the second air-fuel mixture encounter each other, air-fuel mixtures from the two scavenging ports positioned away from each other gently merge together, so that a tumble flow occurs in the combustion chamber 10, enabling the interior of the combustion chamber 10 to be scavenged throughout. Due to the offset of the collision position from the central portion, even if the air-fuel mixtures reverse at that position, no shortcut to the exhaust port 22 occurs.

Since at this time the first left scavenging port 34(lef-1) and the second right scavenging port 34(rig-2) are not open, precedent scavenging flows can flow in while keeping the designed desired directivity without being affected by a scavenging flow from an adjacent scavenging port. Describing in detail, in the case where in FIG. 6(I) the first left scavenging port 34(lef-1) opens in synchronism with the second left scavenging port 34(lef-2), the scavenging flow flowing in from the second left scavenging port 34(lef-2) cannot approach and reach the wall surface on the intake side due to the presence of a scavenging flow from the first left scavenging port 34(lef-1). The scavenging flow from the first left scavenging port 34(lef-1) comes into contact with the second left scavenging port 34(lef-2) and is deflected to the exhaust side, making a shortcut to the exhaust port 22. Since in this embodiment the scavenging ports adjacent to each other on the left side and the right side open at different timings, the directivity of the second left scavenging port 34(lef-2) and the first right scavenging port 34(rig-1) precedently introduced into the cylinder 4 is kept and the scavenging flows do not undergo the deflection caused by the contact between the adjacent scavenging flows, thereby more securely preventing the shortcut of unburned gas to the exhaust port 22.

FIG. 7 shows the state when the piston 8 descends by a predetermined distance from the state of FIG. 6, and shows the state when the second right scavenging port 34(rig-2) and first left scavenging port 34(lef-1) of the second diagonally positioned set begin to open. A line Ln(2) indicates an upper edge position of the piston 8. In this state, the four scavenging ports 34 are all open. That is, the first mutually opposed set Opos-No. 1 and the second mutually opposed set Opos-No. 2 are open. Although the first and third fuel mixtures discharged from the first opposed set Opos-No. 1 (the first right scavenging port 34(rig-1) and the first left scavenging port 34(lef-1)) meet in a second area ((I) of FIG. 7), even if a collision occurs, the collision speed is slow because it is not the beginning of the scavenging process, with the result that the reversal from the collision position and the shortcut to the exhaust port 22 are hard to occur. Since the first air-fuel mixture discharged from the first right scavenging port 34(rig-1) has already flowed into the second area, the second area occurs at a position offset from the central portion of the cylinder 4.

Although the second and fourth air-fuel mixtures discharged from the second opposed set Opos-No. 2 (second right scavenging port 34(rig-2) and the second left scavenging port 34(lef-2)) meet in a third area ((I) of FIG. 7), since the second air-fuel mixture discharged from the second left scavenging port 34(lef-2) has already flowed in, the third area occurs at a position offset from the central portion of the cylinder 4. Since the collision in the third area occurs later not at the beginning of the scavenging process, this collision is weak.

In this manner, also regarding the air-fuel mixtures introduced from the second opposed set Opos-No. 2, the air-fuel mixtures from the two spaced-apart scavenging ports gently merge at the position offset from the central portion. Due to avoidance of collision between the first set and the second set Opos-No. 1, Opos-No. 2, tumble flows occur constantly in the combustion chamber 10 at different timings during the scavenging process, enabling the combustion chamber 10 to be scavenged throughout. By synchronizing the opening timings of the opposed scavenging ports with each other and by separating the opening timings in time as the first set Opos-No. 1 and the second set Opos-No. 2, the shortcut of unburned gas to the exhaust port 22 at the beginning of the scavenging can be prevented and the tumble flows are generated one after another inside the combustion chamber 10 so that burned combustion gas in the entire combustion chamber 10 is scavenged throughout, achieving full replacement with fresh gas.

FIG. 8 shows the state immediately before the four scavenging ports 34 close as a result of further descent of the piston 8 from the state of FIG. 7. A line Ln(3) indicates an upper edge position of the piston 8. In this state, the four scavenging ports 34 are all open and the air-fuel mixture is discharged from each of the scavenging ports 34 into the combustion chamber 10.

Air-fuel mixtures discharged from the scavenging ports 34 are indicated by arrows. Seeing this diagram, the air-fuel mixtures discharged from the scavenging ports 34(rig-1) and 34(lef-1) of the first opposed set Opos-No. 1 seem to meet. Similarly, the air-fuel mixtures discharged from the scavenging ports 34(rig-2) and 34(lef-2) of the second opposed set Opos-No. 2 facing each other seem to meet. However, one of the scavenging ports 34 of the first opposed set Opos-No. 1 facing each other begins to open earlier. This time difference makes a difference in the flow velocities of the air-fuel mixtures (fresh gas) discharged from the two scavenging ports of the first opposed set Opos-No. 1. Therefore, the air-fuel mixtures discharged from the two scavenging ports of the first opposed set Opos-No. 1 do not merge in the central portion of the cylinder 4. Similarly, one of the scavenging ports 34 of the second opposed set Opos-No. 2 begins to open earlier, and the other beings to open later. This time difference makes a difference in the flow velocities of the air-fuel mixtures (fresh gas) discharged from the two scavenging ports of the second opposed set Opos-No. 2. Therefore, the air-fuel mixtures discharged from the two scavenging ports of the second opposed set Opos-No. 2 do not merge in the central portion of the cylinder 4. In this manner, even at the timing when the four scavenging ports 34 are open at the same time, in the central portion of the cylinder 4 there are no occurrences of collision and confluence of opposed scavenging flows and mutual interference of adjacent scavenging flows in their respective directivities.

In the two scavenging ports 34 making up the first set Opos-No. 1 facing each other, one begins to open earlier and the other beings to open later. The air-fuel mixture (fresh gas) discharged from the relatively earlier opened scavenging port 34 into the combustion chamber 10 has a high flow velocity. The air-fuel mixture (fresh gas) discharged from the later opened scavenging port 34 into the combustion chamber 10 has a relatively low flow velocity. Subsequently, when the opening areas of the two scavenging ports 34 making up the first opposed set Opos-No. 1 increase, the pressures of the air-fuel mixtures discharged from the scavenging ports 34 decrease, whereby the flow velocities of the air-fuel mixtures discharged from the two scavenging ports 34 become low.

Similarly, in the two scavenging ports 34 making up the second opposed set Opos-No. 2, one begins to open earlier and the other beings to open later. The air-fuel mixture (fresh gas) discharged from the earlier opened scavenging port 34 into the combustion chamber 10 has a high flow velocity. The air-fuel mixture (fresh gas) discharged from the later opened scavenging port 34 into the combustion chamber 10 has a relatively low flow velocity. Subsequently, when the opening areas of the two scavenging ports 34 making up the second opposed set Opos-No. 2 increase, the pressures of the air-fuel mixtures discharged from the scavenging ports 34 decrease, whereby the flow velocities of the air-fuel mixtures discharged from the two scavenging ports 34 become low.

As described above, in the two sets of diagonally positioned scavenging ports 34, the flow velocities of the air-fuel mixtures discharged from the diagonal scavenging ports 34 of the second diagonal set Diag-No. 2 that begin to open later are lower than the flow velocities of the air-fuel mixtures discharged from the first diagonal set Diag-No. 1 that begin to open precedently. Due to the velocity differences in the relative flow velocity between the air-fuel mixtures (fresh gas) discharged from the diagonal first and second sets Diag-No. 1 and Diag-No. 2, strong collisions in the central portion of the cylinder 4 can be avoided among the air-fuel mixtures (fresh gas) discharged from the four scavenging ports 34.

As has been described with reference to FIG. 5, the lower edges 34b of the four scavenging ports 34 have the same height level. In other words, the opening height of the diagonal scavenging ports 34 of the second diagonal set Diag-No. 2 that begin to open later is lower than the opening height of the diagonal scavenging ports 34 of the first diagonal set Diag-No. 1 that begin to open precedently. This enables the pressure of the air-fuel mixtures discharged from the scavenging ports 34 of the second diagonal set Diag-No. 2 that begin to open later to be kept at a relatively high value, so that the flow velocity of the air-fuel mixtures discharged from the scavenging ports 34 of the second diagonal set Diag-No. 2 can be kept at a certain high level.

From the above functions, according to the two-stroke engine 2 of the embodiment, the air-fuel mixtures (fresh gas) entering the combustion chamber 10, when the scavenging ports 34 open, have different horizontal angles and flow velocities, thereby making it possible to suppress the occurrence of the shortcut phenomena where part of the air-fuel mixtures (fresh gas) flows in toward the exhaust port 22 as a result of collisions of the air-fuel mixtures (fresh gas) entering the combustion chamber 10 from the four scavenging ports 34. Burned gas in the cylinder 4 can be scavenged by the air-fuel mixtures (fresh gas) entering the combustion chamber 10 from the four scavenging ports 34. The four scavenging ports 34 do not necessarily require four scavenging passages corresponding to the number of the scavenging ports. To achieve the same effect, the scavenging passages may be merged into less than four scavenging passages on the crank chamber 16 side and the four ports may be disposed at positions opening to the cylinder 4.

When the two-stroke engine 2 was actually prototyped to make performance evaluations, the following results were obtained.

(1) Amount of HC in Exhaust Gas:

A reduction effect of approx. 3.1% to approx. 5.9% was able to be confirmed in comparison with our own general and traditional four-flow scavenging type engine.

(2) Output Improvement Effect:

A blow-by reduction leads to improved output. An output improvement effect of approx. 2.1% to approx. 2.8% was able to be confirmed in comparison with our own general and traditional four-flow scavenging type engine.

From the analysis of flows of air-fuel mixtures discharged from the scavenging ports, occurrence of tumble flows in the combustion chamber 10 was confirmed.

FIGS. 9 to 12 show variants of the opening timing and the closing timing of the first set of diagonal scavenging ports Diag-No. 1 and show variants of the opening timing and the closing timing of the second set of diagonal scavenging ports Diag-No. 2.

Figure 9:
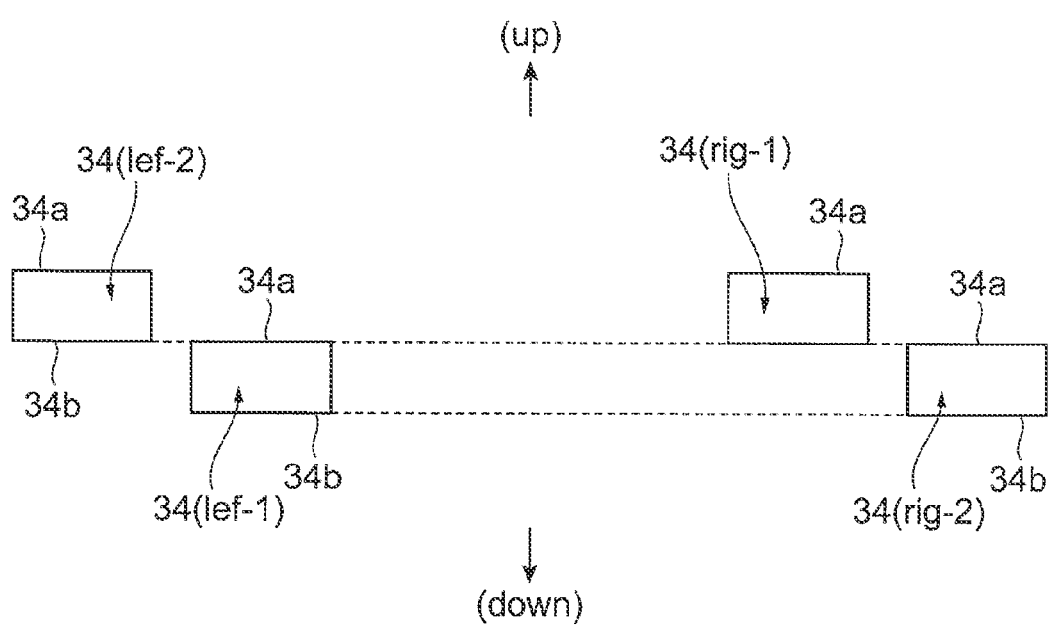
FIG. 9 is a view for explaining a variant of the opening timing and the closing timing of the first set of diagonal scavenging ports and the second set of diagonal scavenging ports.

As can be seen from FIG. 9, the opening timing of the second set of diagonal scavenging ports Diag-No. 2 may be synchronized with the closing timing of the first set of diagonal scavenging ports Diag-No. 1. That is, when the first right scavenging port 34(rig-1) and the second left scavenging port 34(lef-2) of the first diagonal set Diag-No. 1 close, the second right scavenging port 34(rig-2) and the first left scavenging port 34(lef-1) of the second diagonal set Diag-No. 2 may open.

Figure 10:
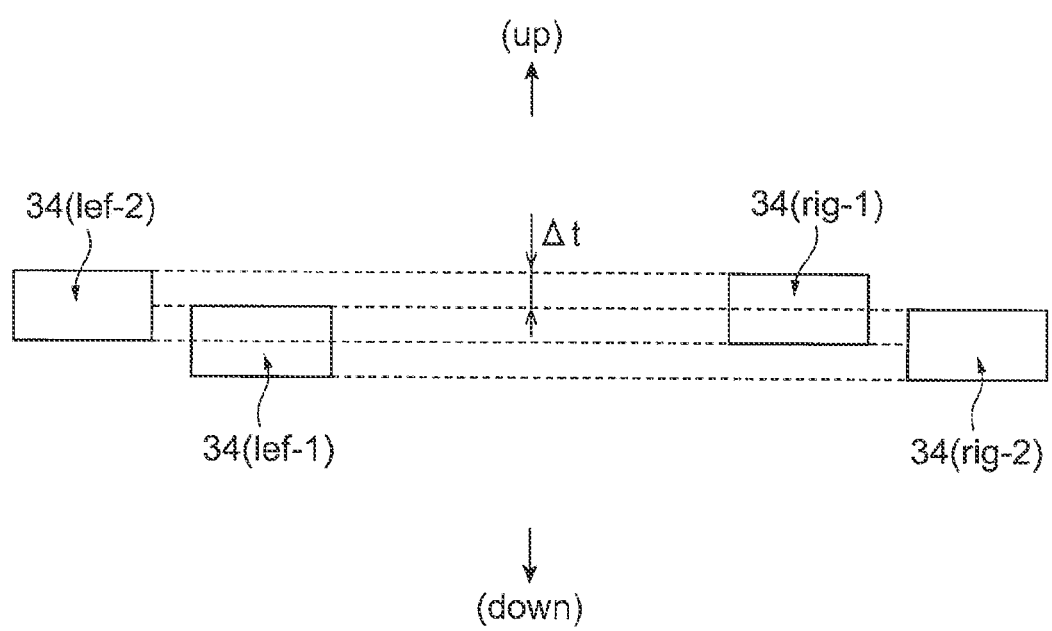
FIG. 10 is a view for explaining a second variant of the opening timing and the closing timing of the first set of diagonal scavenging ports and the second set of diagonal scavenging ports.

As can be seen from FIG. 10, the closing timing of the second set of diagonal scavenging ports Diag-No. 2 may be later than the closing timing of the first set of diagonal scavenging ports Diag-No. 1. That is, the second right scavenging port 34(rig-2) and the first left scavenging port 34(lef-1) of the second diagonal set Diag-No. 2 may close after the first right scavenging port 34(rig-1) and the second left scavenging port 34(lef-2) of the first diagonal set Diag-No. 1 have been closed.

Figure 11:
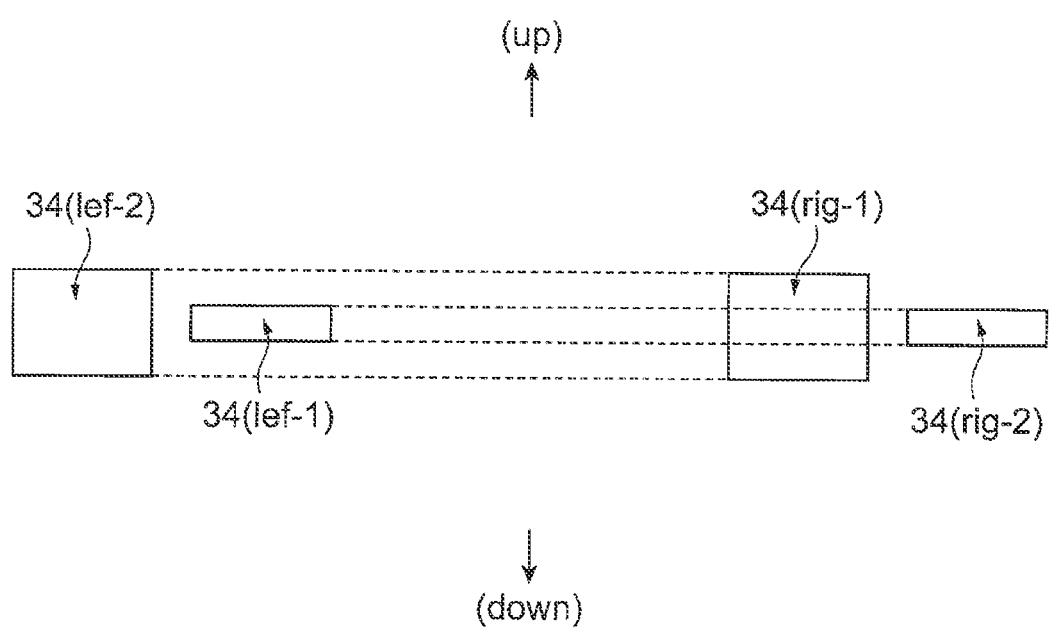
FIG. 11 is a view for explaining a third variant of the opening timing and the closing timing of the first set of diagonal scavenging ports and the second set of diagonal scavenging ports.

As can be seen from FIG. 11, the closing timing of the second set of diagonal scavenging ports Diag-No. 2 may be earlier than the closing timing of the first set of diagonal scavenging ports Diag-No. 1. That is, the second right scavenging port 34(rig-2) and the first left scavenging port 34(lef-1) of the second diagonal set Diag-No. 2 may close before the first right scavenging port 34(rig-1) and the second left scavenging port 34(lef-2) of the first diagonal set Diag-No. 1 are closed.

Although the engine 2 as the traditional two-stroke engine to which the present invention is applied has hereinabove been described as the first embodiment, the present invention is not limited thereto.

Figure 12:
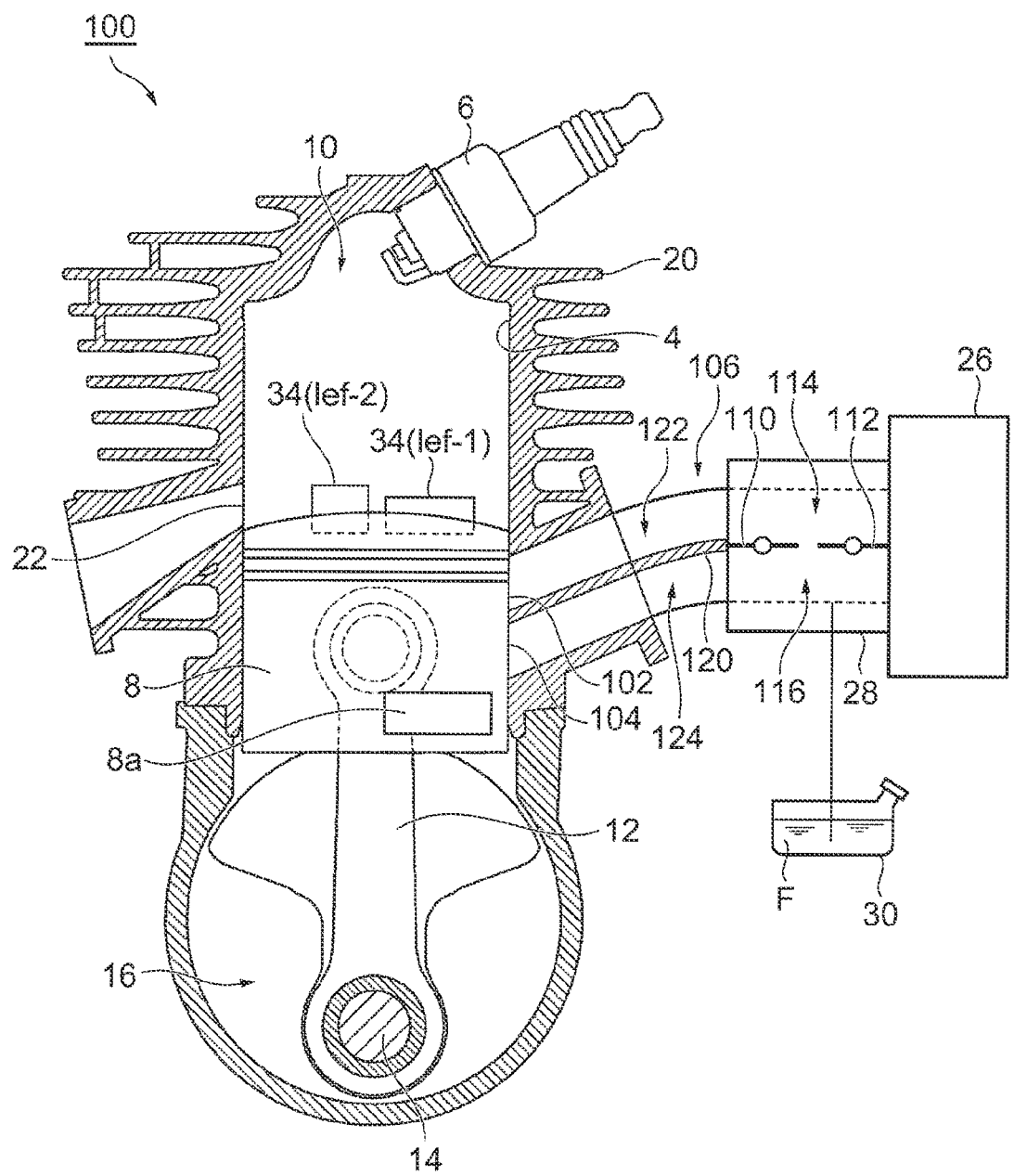
FIG. 12 is a longitudinal section view of a two-stroke engine of a second embodiment in which the present invention is applied to a stratified scavenging type engine.
Figure 13:
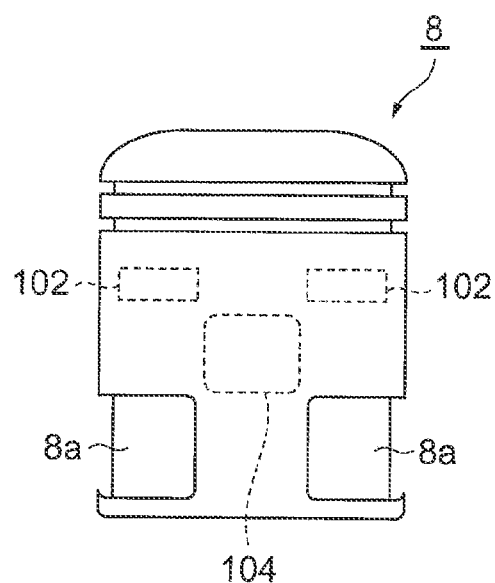
FIG. 13 is a diagram for explaining the positional relationship between the airport and the air-fuel mixture port when the piston is at the bottom dead center in the stratified scavenging type engine of FIG. 12.

FIGS. 12 and 13 show a second embodiment in which the present invention is applied to a stratified scavenging type engine. In describing a stratified scavenging type engine 100 of the second embodiment, the same elements as those of the two-stroke engine 2 of the first embodiment are designated by the same reference numerals and will not again be described.

The stratified scavenging type engine 100 includes the cylinder 4 having an air port 102 and an air-fuel mixture port 104. FIG. 13 is a diagram for explaining the positional relationship between the air port 102 and the air-fuel mixture port 104 when the piston 8 is at the bottom dead center. The air port 102 is supplied with air from an intake system. The air fed to the air port 102 is supplied as leading air to the upper portion of the scavenging passage 34 (FIG. 2) through a piston groove 8a formed on the circumferential surface of the piston 8. On the other hand, the air-fuel mixture port 104 is supplied with air-fuel mixture from the intake system. The air-fuel mixture from the intake system is supplied to the crank chamber 16 through the air-fuel mixture port 104.

The intake system of the stratified scavenging type engine 100 includes the carburetor 28 following the air cleaner 26, and an intake pipe 106 following the carburetor 28. The carburetor 28 includes a throttle valve 110 and a choke valve 112, which are both composed of a butterfly valve. The carburetor 28 forms therein an air passage 114 and an air-fuel mixture production passage 116 when both the throttle vale 110 and the choke valve 112 are fully opened.

The intake pipe 106 includes a partition wall 120 by which an air passing passage 122 and an air-fuel mixture passing passage 124 are defined. The air passage 114 in the carburetor 28 communicates with the air passing passage 122 of the intake pipe 106. Air filtered by the air cleaner 26 is supplied to the airport 102 through air passage 114 and the air passing passage 122.

On the other hand, the air-fuel mixture passing passage 124 communicates at its upstream end with the air-fuel mixture production passage 116 in the carburetor 28, and communicates at its downstream end to the crank chamber 16. Air-fuel mixture produced through the air-fuel mixture production passage 116 of the carburetor 28 is supplied to the crank chamber 16.

In the scavenging process of the stratified scavenging type engine 100, the leading air is first supplied from the scavenging port 34 to the combustion chamber 10, and then air-fuel mixture pre-compressed in the crank chamber 16 is supplied to the combustion chamber 10.

Figure 14:
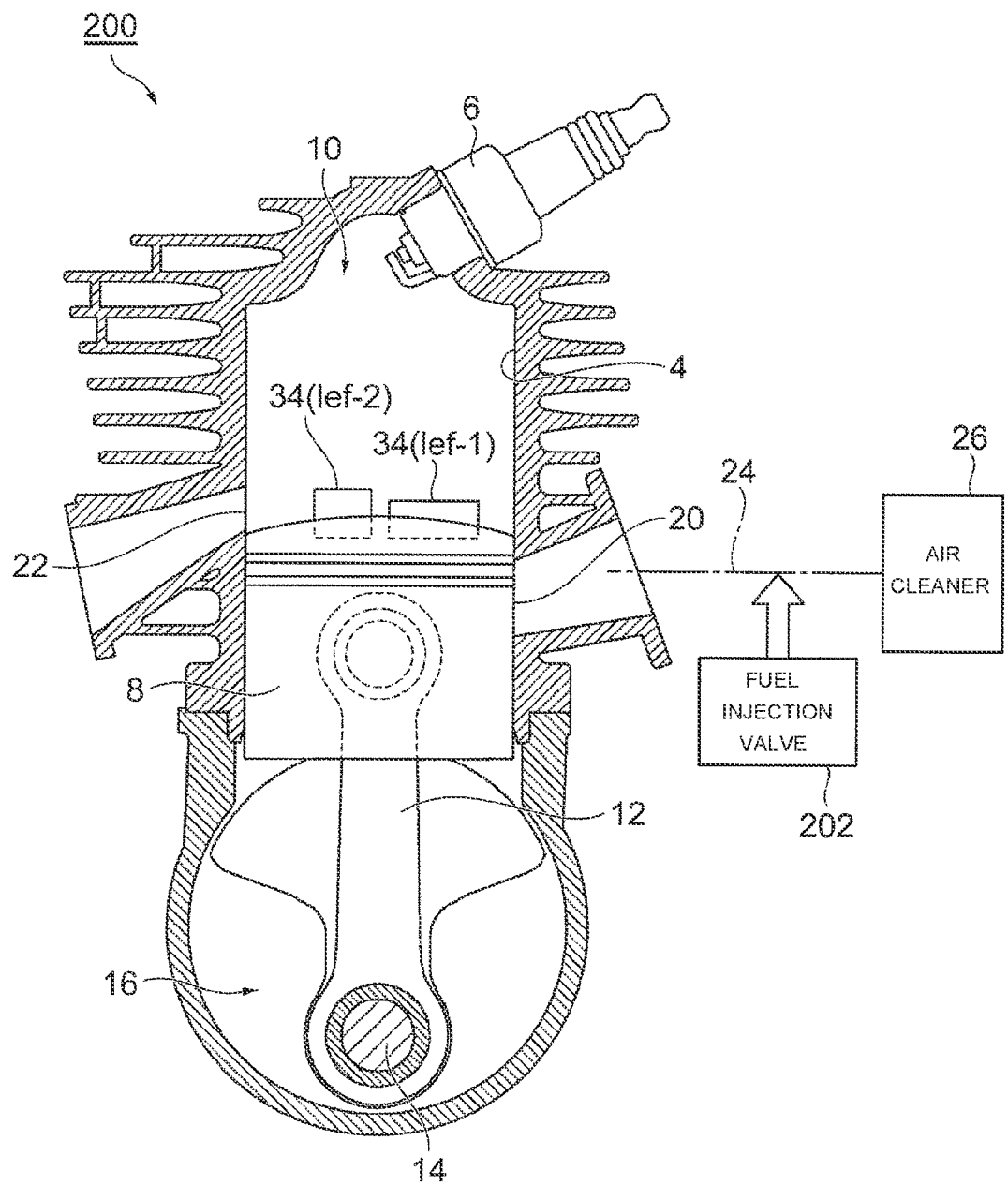
FIG. 14 is a longitudinal section view of a two-stroke engine of a third embodiment, where a fuel injection valve in place of a carburetor is arranged on an intake passage.
Figure 15:
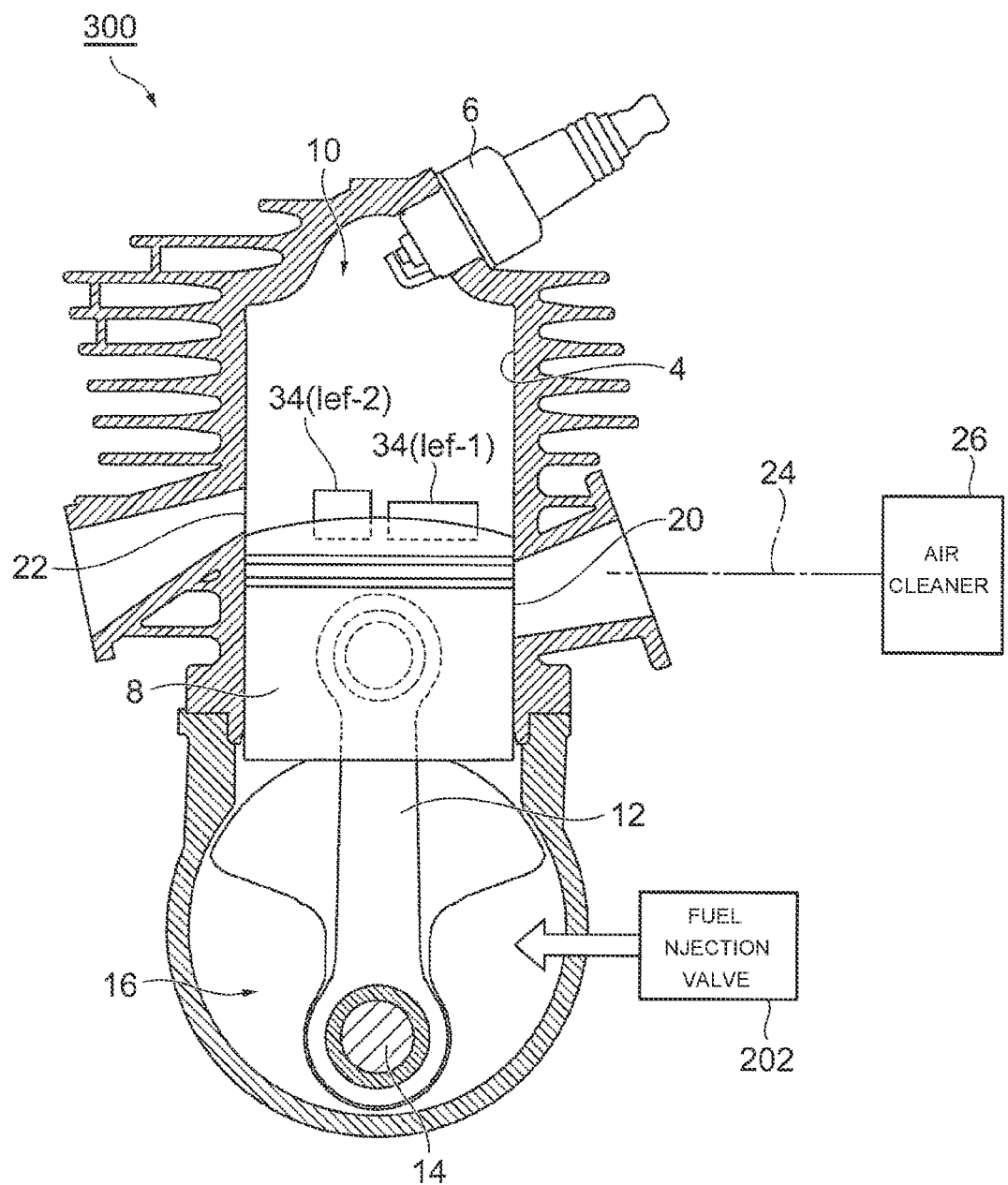
FIG. 15 is a longitudinal section view of a two-stroke engine of a fourth embodiment, where the fuel injection valve in place of the carburetor is arranged facing a crank chamber.

Two-stroke engines 200 and 300 of third and fourth embodiments shown in FIGS. 14 and 15 are each mounted with a fuel injection valve 202 in place of the carburetor 28. In the two-stroke engine 200 of the third embodiment shown in FIG. 14, the fuel injection valve 202 is built in the intake passage 24. In the two-stroke engine 300 of the fourth embodiment shown in FIG. 15, the fuel injection valve 202 is built in the crank chamber 16. Although FIGS. 14 and 15 show the variants of the two-stroke engine 2 shown in FIG.

1, the stratified scavenging type engine 100 shown in FIG. 12 may be mounted with the fuel injection valve 202 in place of the carburetor 28.

As described hereinabove, the present invention is applicable not only to the traditional two-stroke engine but also to the stratified scavenging type engine and is applicable also to the two-stroke engine including the fuel injection valve 202 in place of the carburetor 28. Thus, in the two-stroke engine, the air-fuel mixture or the leading air supplied to the combustion chamber 10 in the scavenging process is referred to as "fresh gas" as a general term thereof. Especially, in the case of application to the stratified scavenging type engine, the following effects can be obtained in addition to the above effects of avoiding collisions and interferences during the air-fuel mixture scavenging. Giving description in the order of the process, air is first introduced at a very early stage of the scavenging process by the precedently opened first diagonal scavenging port group (Diag-No. 1; 34(rig-1) and 34(lef-2)). At this time, the second diagonal scavenging port group (Diag-No. 2; 34(rig-2) and 34(lef-1)) remain closed. According as the piston 8 descends, air begins to be introduced from the second scavenging port group (Diag-No. 2) and then air-fuel mixture is introduced from the first scavenging port group (Diag-No. 1). At this time, since air-fuel mixture is introduced from the first scavenging port group (Diag-No. 1) and air is introduced from the second scavenging port group (Diag-No. 2), the cylinder 4 is filled with the air-fuel mixture and the air. Finally, near the end of scavenging when the piston further descends, air-fuel mixture is introduced from both the first scavenging port group (Diag-No. 1) and the second scavenging port group (Diag-No. 2). In this manner, by applying the present invention to the stratified scavenging type engine, a longer air introduction period of time can be set while keeping the total amount of air introduced. Since pure air without containing air-fuel mixture is introduced at a very early stage of scavenging process, with lean mixture being introduced at an intermediate stage and air-fuel mixture being introduced near the end of the scavenging process, blow-by occurring at an early stage of scavenging process can be reduced, and demerits such as lowered output and poor acceleration arising from insufficient air-fuel mixture can be reduced.

Figure 16:
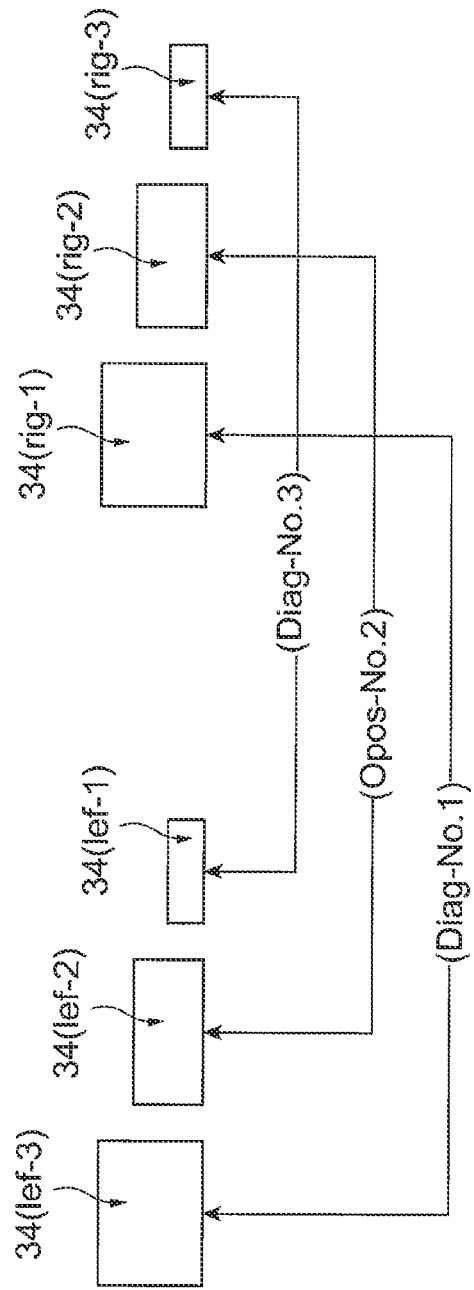
FIG. 16 is a diagram for explaining a diagonal relationship of six scavenging passages when the present invention is applied to a 6-flow scavenging type engine.

Although the engines 2, 200, and 300 of the embodiments where the present invention is applied to the four-flow scavenging type engine have been described as typical examples of the present invention, the present invention is applicable to any two-stroke engine including four or more scavenging ports 34. For example, the present invention is applicable to a 6-flow scavenging type engine disclosed in JP-60-222521A. In the 6-flow scavenging type engine, a specific example of "diagonal" referred to in the present invention is shown in FIG. 16. For example, the first right scavenging port 34(rig-1) and a third left scavenging port 34(lef-3) constitute scavenging ports 34 having a diagonal relationship of a first set Diag-No. 1. For example, a third right scavenging port 34(rig-3) and the first left scavenging port 34(lef-1) constitute scavenging ports having a diagonal relationship of a third set Diag-No. 3. The first diagonal set Diag-No. 1 and the third diagonal set Diag-No. 3 preferably have different opening timings while synchronizing the scavenging ports making up each set of the first and third diagonal sets Diag-No. 1 and Diag-No. 3. In the example of FIG. 16, the second right scavenging port 34(rig-2) and the second left scavenging port 34(lef-2) facing each other are opened in synchronism, with this opening timing being set at a timing different from the opening timing of the scavenging ports making up each set of the first and third diagonal sets Diag-No. 1, Diag-No. 3.

Combinations are exemplarily enumerated below that make the opening timings of the first to third diagonal sets Diag-No. 1 to Diag-No. 3 relatively different.

(1) The first and second right scavenging ports 34(rig-1) and 34(rig-2) and the third left scavenging port 34(lef-3) are set as a first group of mutually diagonal scavenging ports. The third right scavenging port 34(rig-3) and the first and second left scavenging ports 34(lef-1) and 34(lef-2) are set as a second group of mutually diagonal scavenging ports. A plurality of scavenging ports making up the first group may be opened at a first synchronous timing and a plurality of scavenging ports making up the second group may be opened at a second synchronous timing different from the first synchronous timing.

(1) The first and second right scavenging ports 34(rig-1) and 34(rig-2) and the third left scavenging port 34(lef-3) are set as a first group of mutually diagonal scavenging ports. The third right scavenging port 34(rig-3) and the first and second left scavenging ports 34(lef-1) and 34(lef-2) are set as a second group of mutually diagonal scavenging ports. A plurality of scavenging ports making up the first diagonal group may be opened at a first synchronous timing and a plurality of scavenging ports making up the second diagonal group may be opened at a second synchronous timing different from the first synchronous timing.

(2) The first left scavenging port 34(lef-1) and the second and third right scavenging ports 34(rig-2) and 34(rig-3) are set as a first group of mutually diagonal scavenging ports. The first right scavenging port 34(rig-1) and the second and third left scavenging port 34(lef-2) and 34(lef-3) are set as a second group of mutually diagonal scavenging ports. A plurality of scavenging ports making up the first diagonal group may be opened at a first synchronous timing and a plurality of scavenging ports making up the second diagonal group may be opened at a second synchronous timing different from the first synchronous timing.

(3) The first right scavenging port 34(rig-1) and the third left scavenging port 34(lef-3) may be set as a first set of mutually diagonal scavenging ports, the first left scavenging port 34(lef-1) and the second right scavenging port 34(rig-2) may be set as a second set of mutually diagonal scavenging ports, and the second left scavenging port 34(lef-2) and the third right scavenging port 34(rig-3) may be set as a third set of mutually diagonal scavenging ports. The opening timings of the first to third sets may be made different while synchronizing the opening timings of the scavenging ports 34 making up each set of the first to third sets.

As can be seen from the above example, by synchronizing the opening timings of the scavenging ports making up each set or each group while making the opening timing of each diagonal set or each diagonal group different, the 6-flow scavenging type engine can also present similar effects to those of the above four-flow scavenging type engine.

EXPLANATIONS OF LETTERS OR NUMERALS 2 two-stroke engine (four-flow scavenging type) of first embodiment
100 two-stroke engine (stratified scavenging type) of second embodiment
200 two-stroke engine (with fuel injection valve disposed on intake passage) of third embodiment
300 two-stroke engine (with fuel injection valve disposed in crank chamber) of fourth embodiment
4 cylinder 8 piston
10 combustion chamber
16 crank chamber
20 intake port
22 exhaust port
24 intake passage
28 carburetor
32 scavenging passage
34 scavenging port
34a upper edge of rectangular scavenging port
34b lower edge of rectangular scavenging port
iL center line (imaginary line joining intake port and exhaust port)
Diag-No. 1 first set of two diagonal scavenging ports
Diag-No. 2 second set of two diagonal scavenging ports
202 fuel injection valve

What is claimed is:

1. A two-stroke engine that executes scavenging by supplying fresh gas pre-compressed in a crank chamber through scavenging ports to a combustion chamber in a scavenging process, comprising:
at least four scavenging ports,
the four scavenging ports including:
first right and left scavenging ports that lie on a side relatively away from an exhaust port and that lie facing each other with a cylinder in between; and
second right and left scavenging ports that lie closer to the exhaust port than the first right and left scavenging ports do and that lie facing each other with the cylinder in between, wherein
the second left scavenging port and the first right scavenging port that make up a first mutually diagonal set have different opening timings from those of the first left scavenging port and the second right scavenging port that make up a second mutually diagonal set.

2. The two-stroke engine of claim 1, wherein
the two scavenging ports making up the first set have synchronized opening timings.

3. The two-stroke engine of claim 1, wherein
the two scavenging ports making up the second set have synchronized opening timings.

4. The two-stroke engine of claim 1, wherein
the two scavenging ports making up the first set have synchronized opening timings, and wherein
the two scavenging ports making up the second set have synchronized opening timings.

5. The two-stroke engine of claim 2, wherein
the two scavenging ports making up the second set have different opening timings.

6. The two-stroke engine of claim 3, wherein
the two scavenging ports making up the first set have different opening timings.

7. The two-stroke engine of claim 1, wherein
each of the four scavenging ports has an upper edge, the upper edge defining the opening timing of the scavenging port, and wherein
the upper edges of the two scavenging ports making up the first set have height levels different from those of the upper edges of the two scavenging ports making up the second set.

8. The two-stroke engine of claim 1, wherein
the first right and left scavenging ports facing each other with the cylinder in between and the second right and left scavenging ports facing each other with the cylinder in between are directed toward directions away from the exhaust port, and wherein
the first scavenging ports have orientations different from those of the second scavenging ports.

9. The two-stroke engine of claim 8, wherein
the four scavenging ports are substantially rectangular in front view, and wherein
the two scavenging ports making up the first set have vertical opening heights different from those of the two scavenging ports making up the second set.

10. The two-stroke engine of claim 1, wherein
the two-stroke engine is a stratified scavenging type engine, and wherein
in the scavenging process, leading air is introduced into the combustion chamber before air-fuel mixture pre-compressed in the crank chamber is supplied through the scavenging ports to the combustion chamber.

11. The two-stroke engine of claim 8, wherein
the two-stroke engine is a stratified scavenging type engine, and wherein
in the scavenging process, leading air is introduced into the combustion chamber before air-fuel mixture pre-compressed in the crank chamber is supplied through the scavenging ports to the combustion chamber.

12. The two-stroke engine of claim 9, wherein
the two-stroke engine is a stratified scavenging type engine, and wherein
in the scavenging process, leading air is introduced into the combustion chamber before air-fuel mixture pre-compressed in the crank chamber is supplied through the scavenging ports to the combustion chamber.

* * * * *